United States Patent [19]
Dewdney

[11] 3,930,606
[45] Jan. 6, 1976

[54] METHOD AND APPARATUS FOR SECURING WIRES TO CONNECTOR TERMINALS

[75] Inventor: George Franklyn Dewdney, Huntington Beach, Calif.

[73] Assignee: RCA Corporation, New York, N.Y.

[22] Filed: May 20, 1974

[21] Appl. No.: 471,782

[52] U.S. Cl. ......... 228/232; 29/630 A; 174/DIG. 8; 228/4.1; 228/20; 432/226
[51] Int. Cl.² ...................... B23K 1/12; H01R 5/04
[58] Field of Search ............ 228/4, 20, 59, 19, 33, 228/41, 43, 232; 432/226, 230, 229; 29/630A, 629, 628, 626, 627, 473.5, 235, 450; 425/174.4; 174/DIG. 8

[56] References Cited
UNITED STATES PATENTS

| | | | |
|---|---|---|---|
| 3,040,385 | 6/1962 | Folta | 174/DIG. 8 |
| 3,200,471 | 8/1965 | Johnson et al. | 29/621 |
| 3,448,182 | 6/1969 | Derbyshire et al. | 174/DIG. 8 |
| 3,455,022 | 7/1969 | Schmitz, Jr. | 29/628 |
| 3,679,189 | 7/1972 | Deal et al. | 432/226 |
| 3,775,527 | 11/1973 | Kinney, Jr. et al. | 174/DIG. 8 |
| 3,801,246 | 4/1974 | Gustavsson | 425/174.4 |
| 3,861,033 | 1/1975 | Updyke et al. | 29/628 |

*Primary Examiner*—Francis S. Husar
*Assistant Examiner*—Gus T. Hampilos
*Attorney, Agent, or Firm*—Edward J. Norton; William Squire

[57] ABSTRACT

An apparatus for soldering a wire to a terminal includes a plurality of connector clamps secured to a turntable for positioning each clamped connector adjacent a hot air blower. The hot air blower blows hot air toward a solder ring and heat shrinkable tube surrounding the wire and a corresponding connector terminal for melting the solder and shrinking the tube. The apparatus includes a baffle for redirecting the blown hot air back toward the solder ring and tube assembly for preheating the assembly.

7 Claims, 5 Drawing Figures

METHOD AND APPARATUS FOR SECURING WIRES TO CONNECTOR TERMINALS

BACKGROUND OF THE INVENTION

1. Field of Invention

The present invention relates to apparatus for securing wires to terminals of multiterminal connectors. The terminals in the connectors are the type comprising solder cups for receiving bared wire ends.

2. Description of the Prior Art

While the soldering of wires to the terminals cups is accomplished in various ways, one present technique is the use of solder rings disposed in heat shrinkable tubes.

In this arrangement a solder ring is disposed within a small, elongated thermoplastic tubular member. The solder ring is compressibly secured in a relatively fixed position within the tubular member by the member. The plastic tube is the type that shrinks when exposed to heat.

In securing the wire to a cup-type terminal, the solder ring and tube combination are placed over the bared wire end received in the terminal cup. Hot air is then blown or directed against the tubular member and solder ring assembly. The heat is sufficient to melt the solder ring and at the same time causes the tube to shrink. The solder, when melted, flows into the cup forming a solder connection between the bare wire end and the cup. The shrinking of the plastic tube provides a secured insulation over the soldered wire end and terminal.

The problem with this system is that it is cumbersome to implement. An operator needs to assemble the wire and plastic tube and solder ring combination to a connector terminal. Usually a large number of terminals are present on each connector. Then the operator has to either place the joints in front of the hot air or else direct the hot air against the joints. The temperature at which this is accomplished is difficult to control at the joint. Excessive or insufficient heat tends to produce a poor joint. To accomplish the interconnections of hundreds of connectors in this manner is a tedious task.

SUMMARY OF THE INVENTION

An apparatus for soldering a wire to a terminal comprises means for positioning each of a plurality of terminals to a given position. Means are mounted on the positioning means for releaseably securing a separate, different wire to each of the terminals. A heat shrinkable tube and solder ring are disposed about each wire at the respective terminals. Means are provided for directing a flow of hot gaseous fluid at the given position at an increasing temperature for melting the solder and shrinking the tube.

IN THE DRAWINGS

FIG. 1 is a plan view of an apparatus constructed in accordance with an embodiment of the present invention, FIG. 2 is an elevational view of the apparatus of FIG. 1, FIG. 3 is a partial sectional end view of the wire and connector securing portions of the apparatus of FIGS. 1 and 2, FIG. 4 is an enlarged elevational view of the apparatus of FIG. 3, and FIG. 5 is a sectional elevational view of a heat shrinkable tube and solder ring combination.

DETAILED DESCRIPTION

Figure 1:
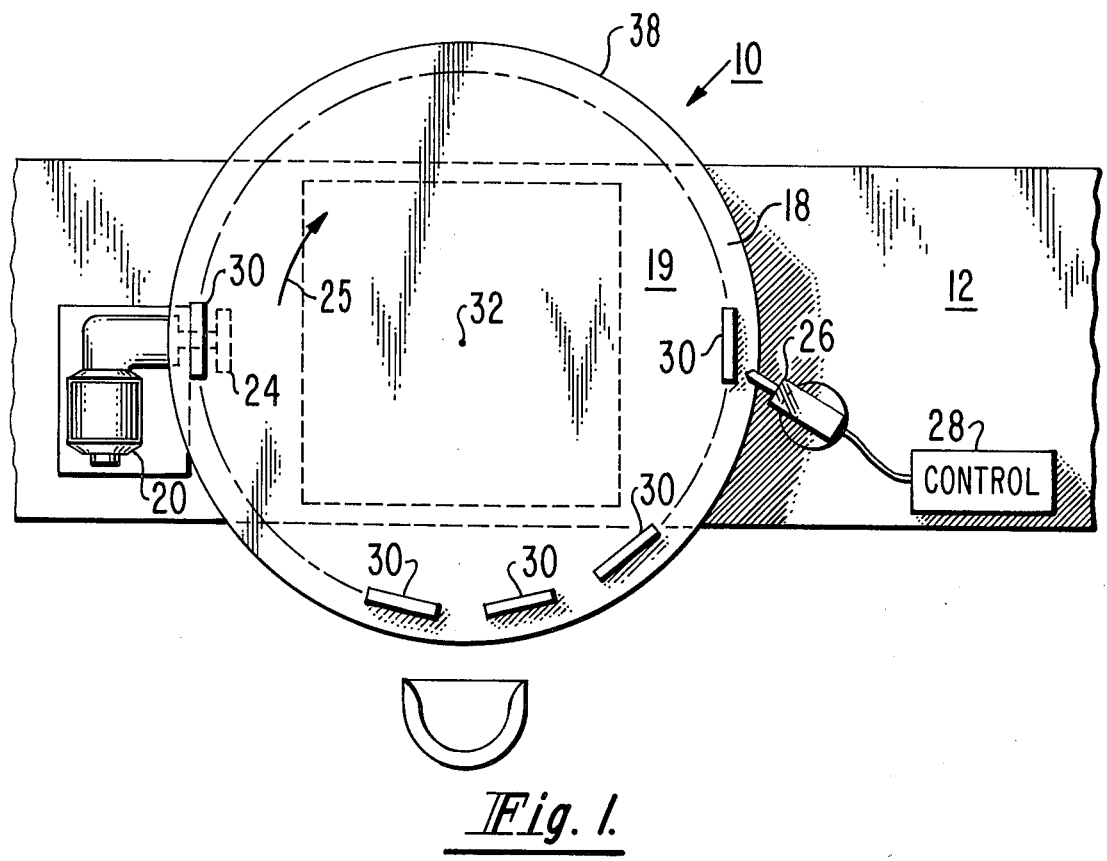
Figure 2:
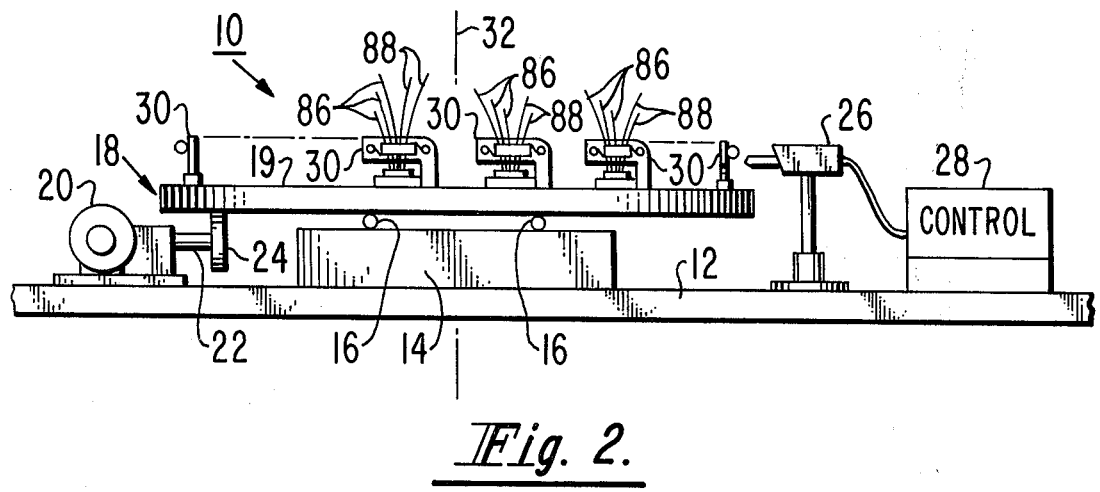

In FIGS. 1 and 2 soldering apparatus 10 is mounted on a table 12 or other suitable support. Apparatus 10 includes a turntable support 14 mounted on table 12. Support 14 may be made of any material including wood. Support 14 includes a suitable ball bearing assembly 16 for providing anti-friction rotation to turntable 18 rotatably mounted on assembly 16. Turntable 18 is preferably made out of a planar sheet of plywood or other suitable material. Also mounted on table 12 is a drive motor and gear box assembly 20. Motor and gear box assembly 20 is of conventional arrangement and has an output drive shaft 22 to which is secured a rotating friction wheel 24 driven by shaft 22.

Friction wheel 24 is in frictional engagement with the underside planar surface of turntable 18 for rotating turntable 18 in the direction of arrow 25. Also secured to table 12 is a hot air blower 26 which is connected to a source of air under pressure and heater control 28. Blower 26 serves to direct a stream of air under an elevated temperature and pressure determined in accordance with the controls set in control 28. Blower 26 and control 28 are manufactured by the Raychem Corp. of Menlo Park, California as superheater model AA-400.

Mounted on the upper surface 19 of turntable 18 are a plurality of wire and connector securing fixture assemblies 30. A large plurality of assemblies 30, for example 32 or more, are secured to table 18 in a circular array radially equidistant about the axis of rotation 32 on table 18. Both the radial position and orientation of each assembly 30 with respect to axis 32 is substantially the same.

Figure 3:
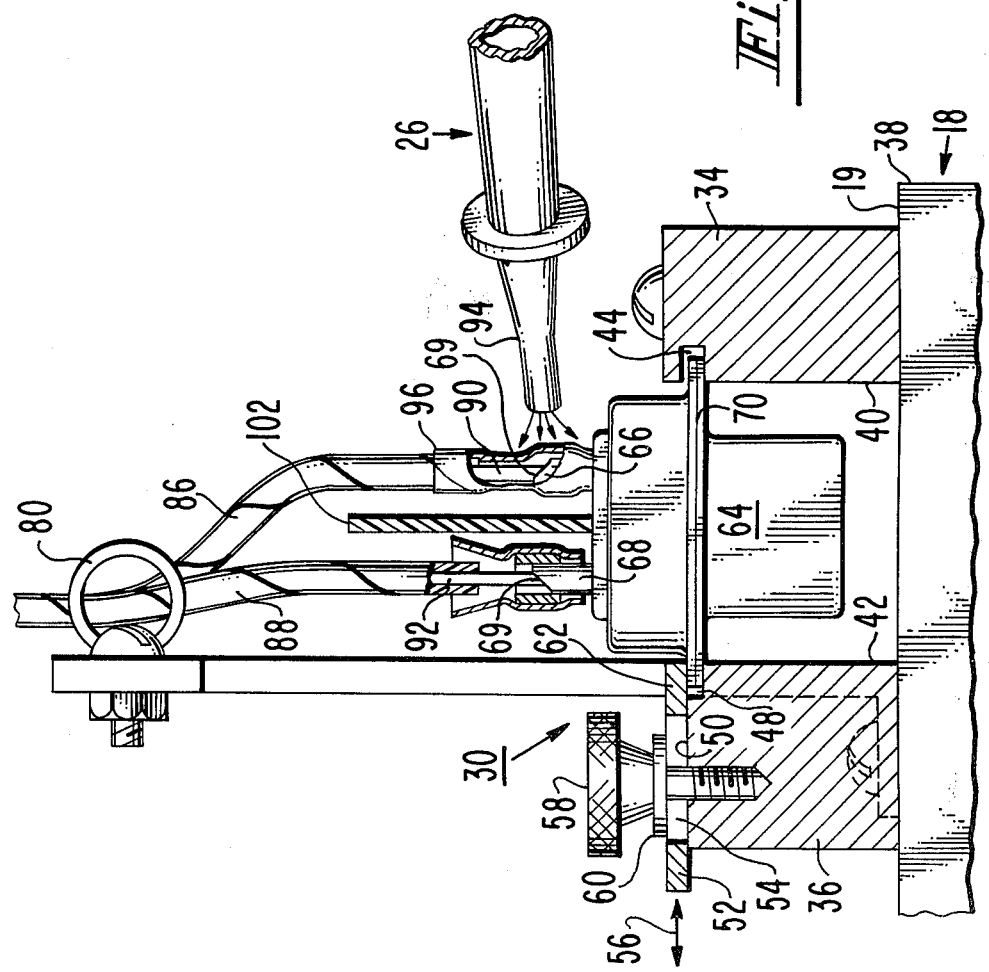

Each assembly 30, FIG. 3, includes a connector clamp which comprises a pair of elongated bar-type connector supports 34 and 36 disposed on surface 19 in parallel relationship concentric with respect to axis 32. Support 34 is next adjacent the outer peripheral edge 38 of turntable 18. Support 36 is disposed radially inwardly and in radial alignment with support 34 so that supports 34 and 36 have common surfaces 40 and 42, respectively, facing each other. Disposed in face 40 of support 34 is channel-like slot 44. Slot 44 is spaced from and parallel to the upper surface 19 of table 18 and extends the length of support 34.

Disposed in support 36 is a recess 48. Recess 48 is disposed equidistant from surface 19. Slot 44 is also diagonally equidistant from surface 19 the same distance as recess 48. Recess 48 forms an L-shaped shoulder 36 in communication with the surface 42 and upper surface 50 of support 36 as shown. Recess 48 extends the length of support 36 parallel to slot 44 and facing slot 44.

Disposed contiguous with surface 50 and support 36 is locking bar 52. Locking bar 52 is an elongated planar member which extends the length of surface 50 of support 36. Disposed centrally in bar 52 and running transverse the length thereof is elongated slot 54. Slot 54 permits bar 52 to transverse in a radial direction as indicated at arrow 56. Threaded to support 56 is locking nut 58 having a shoulder 60 which locks bar 52 in a given radial position with respect to recess 48.

When bar 52 is in its most radially outward position, as illustrated in FIG. 3, the outer longitudinal edge 62 serves to form a clamping jaw over recess 48. Disposed in the opposite radial inward direction, to the left in the drawing, the bar 52 is in the release position.

Slot 44 and recess 48 serve to clamp multipin connector 64 to supports 34 and 36. Connector 64 is a conventional connector having a plurality of cup-type contact terminals 66 and 68 aligned in two parallel rows extending into the drawing. The cup upper periphery 69 is arranged to expose the cup interior along the horizontal and vertical axis. The cup is oriented with the cup interior being exposed to and facing outwardly from the connector 64 in a radial direction with respect to axis 32.

Connector 64 has a flange or shoulder 70 which extends around the periphery of the connector. Shoulder 70 is disposed in slot 44 and recess 48. Locking bar 52, when disposed in the most outward radial position, as shown in FIG. 3, overhangs shoulder 70. To secure the connector 64, locking nut 58 is threaded tightly against locking bar 52 forming a clamp.

Figure 4:
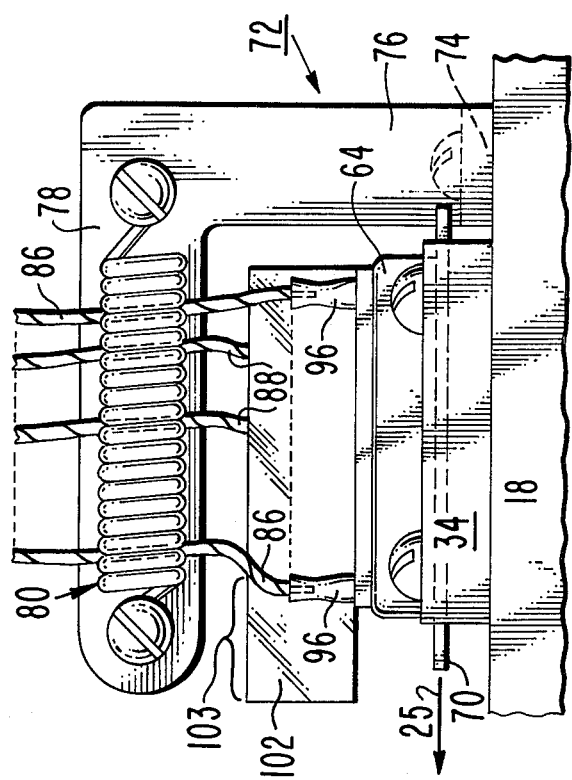

Mounted adjacent support 36, as best seen in FIG. 4, is an L-shaped wire support member 72. Member 72 is mounted on turntable 18 by a suitable L-shaped bracket 74. Member 72 includes upstanding leg 76 and cantilevered horizontally disposed leg 78. Leg 78 extends the length of support 36 and is disposed above recess 48. Secured to leg 78 along the length thereof is a tightly wound coil spring 80. Spring 80 serves to secure wires 86 and 88 between adjacent spring windings. Spring 80 resiliently secures the wires thereto by the compression of the adjacent coils. As shown in FIG. 3, wires 86 and 88 have the bared ends 90 and 92 disposed in the cups of terminals 66 and 68, respectively. The hot air blower 26 has a nozzle 94 directed at the junction of bare end 90 and the radially outermost terminal 66. The temperature, direction, spacing of the nozzle from the junction and pressure of the hot air dispensed by nozzle 94 toward terminal 66 and wire end 90 have a predetermined relationship as will be described.

Figure 5:
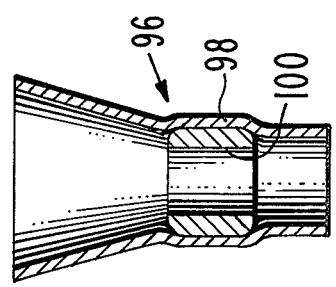

Disposed over wire end 90 and terminal 66 is heat shrinkable tube and solder ring assembly 96. This assembly is illustrated in FIG. 5 wherein the tube portion includes an elongated thermoplastic tubular member 98 which shrinks upon the application of heat thereto. Solder ring 100 is compressibly disposed within the member 98. Assembly 96 is a commercially available product and is manufactured by the Raychem Corp., Menlo Park, California. Assembly 96 is slipped over the joint comprising wire end 90 and terminal 66, such that the ring 100 is adjacent the bare wire end 90 with a portion of ring 100 above and a portion below the upper peripheral edge of the cup of terminal 66.

A thin stiff planar baffle member 102 is disposed between the two rows of terminals comprising terminals 66 and 68. Baffle 102 is preferably made of polytetraflourethylene commonly known as teflon or other suitable material. Baffle 102 serves to deflect the hot air blown from nozzle 94 back toward solder ring assembly 96. The hot air is initally blown on or past solder ring assembly 96 from nozzle 94 toward baffle 102. Baffle 102 serves to provide efficient and rapid melting of the solder ring 100 and shrinking of tube 98 by redirecting the hot air flowing past the solder ring assembly 96 back toward the several assemblies 96.

Baffle 102 includes a leading edge portion 103 (FIG. 4) which extends beyond the connector 64 in the direction of arrow 25. The nozzle 94 is pointed toward the assembly 30 at an angle opposite arrow 25 in the range of 19°–25° made with a line extending radially through assembly 30 and axis 32. This angle is essential to maintain the proper temperature at assembly 96 (FIG. 3). With this angle and with wires 86 and 88 of 24 gauge, the temperature of the air blown by nozzle 94 is in the range of 880°–920° F while the pressure is in the range of 45–48 PSI. The assembly 96 is spaced from the end of nozzle 94 about 0.2 inches. The angular rotation of the table 18 is such that each assembly 96 is disposed in the direct path of the air blown by nozzle 94 for a period of about 4–5 seconds. At this continuous rotational rate the hot air from nozzle 94 is blown first against the leading edge portion 103 of baffle 102 and deflected back toward the assemblies 96 prior to the direct forcing of the hot air at the assembly 96. This preheats the assemblies 96 for about 15 seconds. This preheating is an essential feature of the present invention.

In the preferred embodiment, with the pressures and temperatures noted above, the leading edge portion 103 is about ½ inch in length in the direction of arrow 25. As a result of the direction of the hot air at the baffle 102, the temperature and pressure of the hot air from nozzle 94 is reduced by the increased length of the flow path and the change in direction of the hot air. This reduced temperature and pressure results in a gradual increase of the temperature and pressure. This permits a uniform and consistent shrinkage of tube 98 and melting of ring 100 at the maximum temperature and pressure as defined by the ranges noted above herein when the assembly 96 is subsequently directly in front of nozzle 94.

Without preheating, an increased temperature is required to shrink the member 98 and melt solder ring 100. However, this increased temperature tends to discolor the member 98 and may otherwise cause a poor joint. A lowered temperature will not shrink the member 98 and melt the solder 100 in a satisfactory manner. Thus the preheating prepares the assembly 98 for the directly blown hot air from nozzle 94 when the assembly 96 does, in fact, pass in front of nozzle 94. Therefore, the baffle 102 serves an essential function in the proper operation of the apparatus constructed in accordance with the present invention.

The spacing of the nozzle from the assembly 96, temperature, pressure and rotational rate correspond to a particular gauge wire, and thus a particular size assembly 96. It should be appreciated that these parameters may require adjustment in accordance with a particular size tube and solder ring assembly which would differ substantially from the exemplary size of assembly 96 used with a 24 gauge wire. Such adjustment is within the ability of one skilled in this art.

In operation an operator secures a connector 64 in a corresponding wiring connector securing assembly 30. In the arrangement of FIG. 1, there are 32 connectors 64 assembled on turntable 18. Each connector is uniformly spaced from nozzle 94 when rotated on turntable 18 past nozzle 94. Connector 64 is assembled to the supports 34 and 36 with the shoulder 70 in the recess 48 and slot 44. Locking bar 52 locks shoulder 70 in place securing the connector 64.

An operator slips a solder ring assembly 96 over each wire 86 and 88, and so forth, to be assembled to the connector 64 and the remaining connectors assembled at each of the assemblies 30 on turntable 18. The wire is slipped between the coils of coil spring 80 to secure the wires thereto. The bared end of the wires adjacent connector 64 are each disposed in the cup terminals 66 and 68. The solder ring assembly 96 is then slipped downward over the cup with a portion of the solder ring 100 adjacent the bare wire end slightly above the cup terminal. All of the connectors 64 are assembled at the corresponding securing assemblies 30.

Baffle 102, which is a separate member is disposed between the terminals 66 and 68 in the vertical position as shown in FIG. 4 at each assembly 30. The operator starts the rotation of turntable 18. At the same time, blower 26 is turned on. The hot air is first blown indirectly against soldr ring assembly 96 bare wire end 90 and cup terminal 66 by way of baffle 102 which deflects the air from nozzle 94. The timing of the table with respect to the pressure and temperature of hot air from nozzle 94 is such as to cause the solder ring 100 to melt and the tube 98 to shrink. The turntable will complete, for example, in about an hour and a half one complete revolution past nozzle 94. At this time all of the radially outermost wires are thus soldered and secured to the corresponding terminals of the connector 64.

The operator then removes connectors 64 from the position shown in FIG. 3 and reverses the position such that terminals 68 are the radially outermost terminals and terminals 66 are radially inwardly. In this position terminals 68 are next adjacent nozzle 94 when passed adjacent thereto. With baffle 102 still in place and all of the connectors 64 thus reversed in position, turntable 18 is again rotated one full revolution so each of the assemblies 30 pass nozzle 94. At this time all of the terminals will be secured to the respective wires 86 and 88 on all of the connectors on the turntable.

What is claimed is:

1. A method of soldering a wire to a terminal comprising:
    positioning each of a plurality of terminals at a given position,
    releaseably securing a separate, different wire to each of said terminals,
    disposing a heat shrinkable tube and solder ring about each said wire at said terminals, and
    directing a stream of hot gaseous fluid at said given position at a gradually increasing temperature and pressure for melting said solder and shrinking said tube.

2. The method of claim 1 wherein said directing step includes changing the direction and length of path of said stream.

3. The method of claim 1 wherein said directing step includes forming a stream of hot gaseous fluid, deflecting said formed stream of fluid toward said tube and solder ring, and then directing said formed stream of fluid directly on said tube and solder ring after said deflected stream of fluid impinges upon said tube and ring.

4. An apparatus for soldering a wire to a terminal using a heat shrinkable tube and solder ring disposed about said wire at said terminal comprising:
    terminal receiving and positioning means for receiving and positioning each of a plurality of terminals at a given position,
    wire securing means mounted on said positioning means for releaseably securing a separate, different wire adjacent each said terminals, and
    fluid directing means mounted adjacent said given position for directing a stream of hot gaseous fluid at said given position at a gradually increasing temperature and pressure for melting said solder and shrinking said tube.

5. The apparatus of claim 4 wherein said directing means includes a source of said stream and a fluid baffle disposed adjacent said receiving and positioning means for deflecting said fluid from said source to said tube and solder ring when disposed about said wire, said fluid directing means and said receiving and positioning means being arranged to sequentially apply said deflected fluid first and then the undeflected fluid at said position to preheat said tube and solder ring with said deflected fluid.

6. In combination:
    conveying means,
    connector receiving means mounted on the conveying means at a given position for receiving a connector terminal, a wire to be secured to said terminal, and a heat shrinkable tube and solder ring disposed about said wire at said terminal,
    a source of a first hot gaseous fluid stream having a given temperature and pressure mounted adjacent said conveying means and arranged to direct said first stream in a first direction, and
    fluid redirecting means coupled with said conveying means for redirecting said first stream into a second stream flowing in a second direction at a temperature and pressure lower than said given temperature and direction,
    said receiving means, redirecting means and said source being arranged to initially direct said second stream and then said first stream at said given position to sequentially increase the temperature and pressure of the gaseous fluid directed at said given position from said lower temperature and pressure to said given temperature and pressure.

7. The combination of claim 6 wherein said fluid redirecting means is a fluid baffle coupled with said conveying means for deflecting and forming said first stream into said second stream.

* * * * *